June 15, 1926.
J. WHITING
BREAD SLICER
Filed May 20, 1925
1,589,030
2 Sheets-Sheet 2
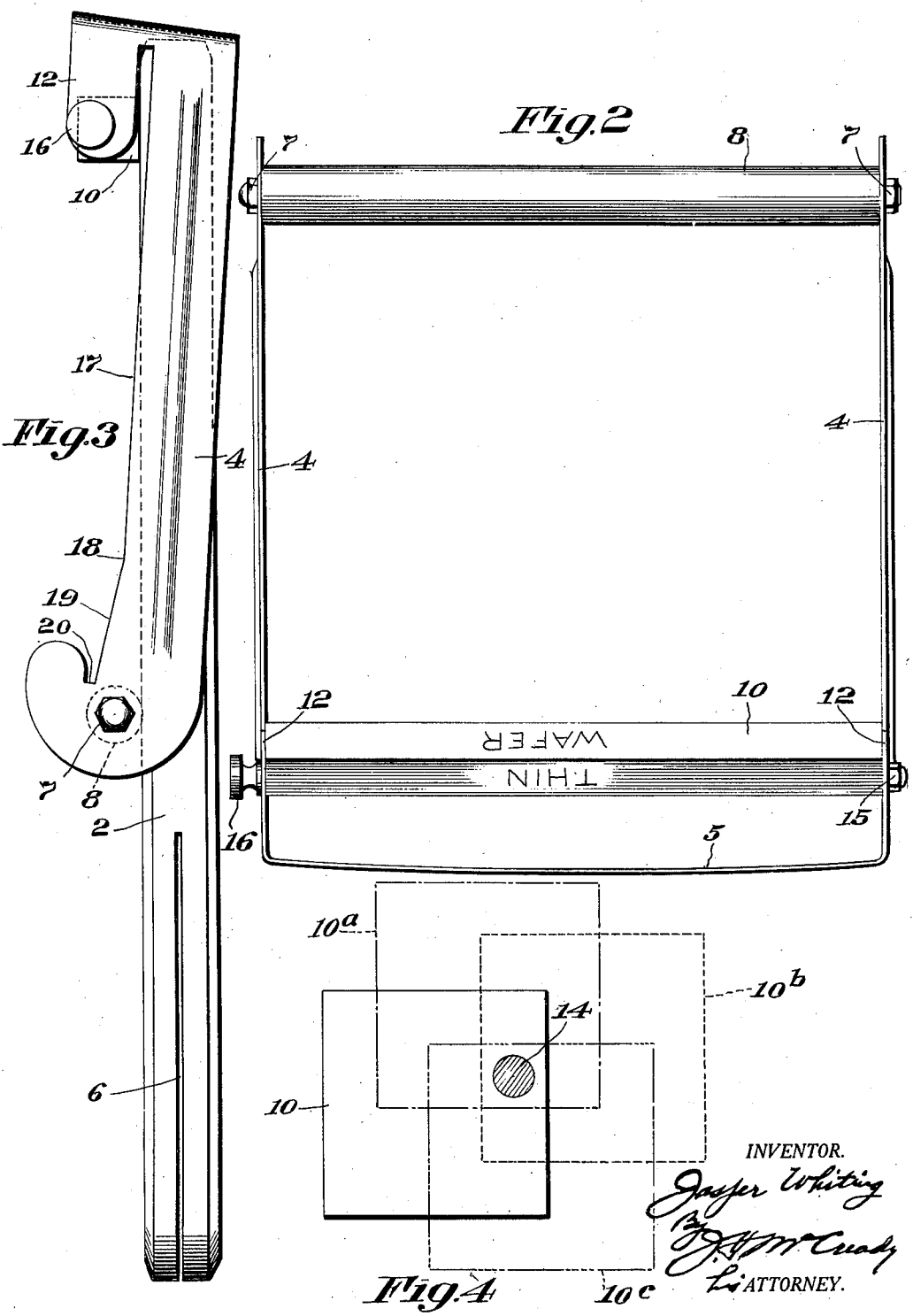

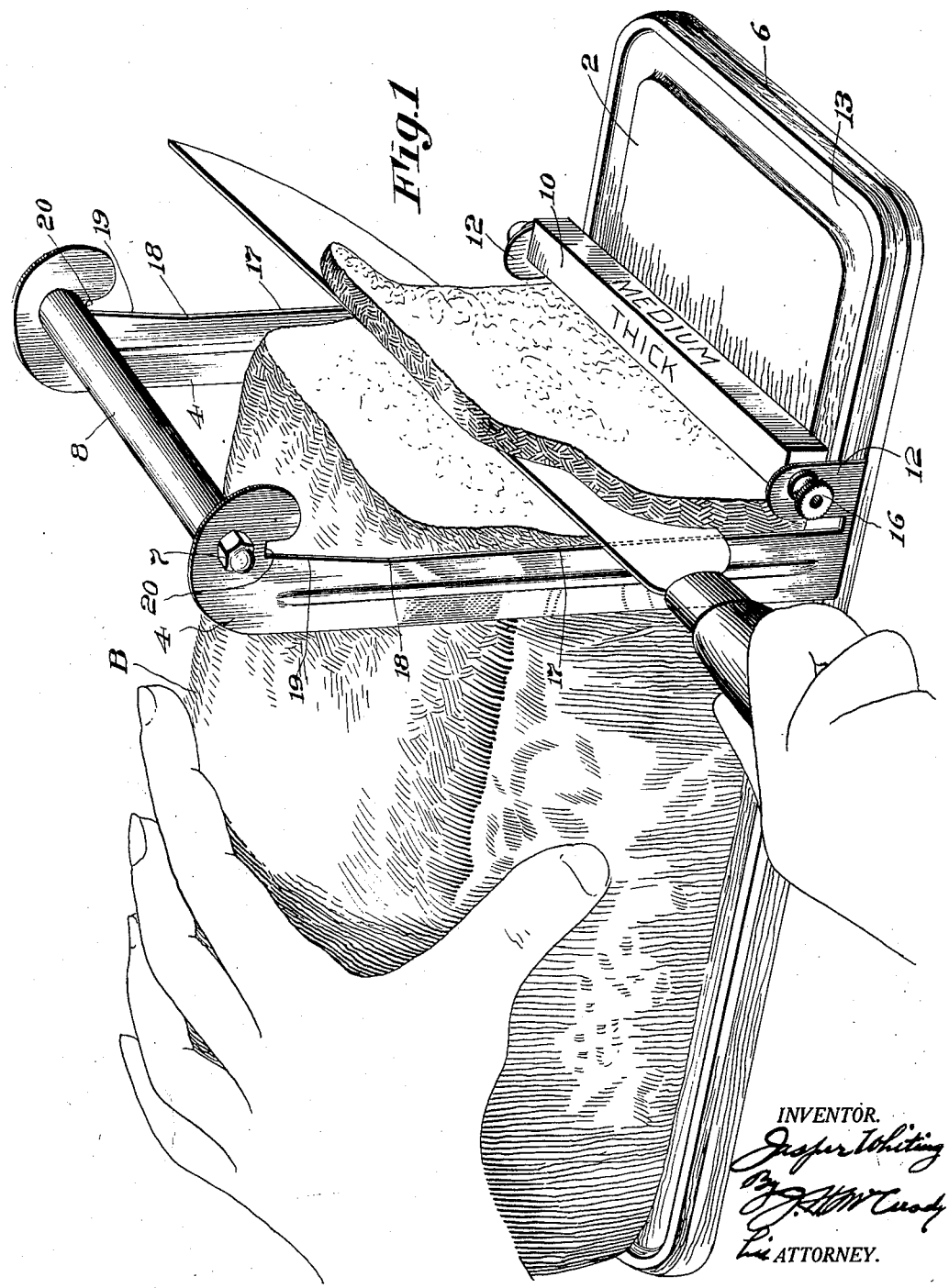

Patented June 15, 1926.                                1,589,030

UNITED STATES PATENT OFFICE.

JASPER WHITING, OF BOSTON, MASSACHUSETTS.

BREAD SLICER.

Application filed May 20, 1925. Serial No. 31,678.

The invention relates to devices for use in slicing bread, cake, cold meats, and the like, hereinafter referred to as bread.

The invention aims to devise an article of this character which will be convenient to use, can readily be adjusted to vary the thickness of the slices made, and which will be so constructed that it can be manufactured economically.

In my Patent No. 1,452,474, dated April 17, 1923, I have shown and described a novel form of bread slicing device, and it is one of the objects of the present invention to further improve and perfect the device shown in said patent with a view to reducing the expense of manufacture, making the device more convenient to use, and facilitating the packing of the devices for shipment.

The nature of the invention will be readily understood from the following description when read in connection with the accompanying drawings, and the novel features will be particularly pointed out in the appended claims.

In the accompanying drawings,

Figure 1 is a perspective view of a bread slicer embodying the invention in the form at present preferred;

Fig. 2 is a front elevation of the metal parts of the device shown in Fig. 1;

Fig. 3 is a side elevation of the bread slicer knocked down and ready to be packed for shipment; and Fig. 4 is a diagrammatic view showing the adjustability of the gage or stop that determines the thickness of the slices.

The device shown comprises a base 2 which is adapted to support a loaf of bread and preferably consists of a wooden board provided with a marginal groove 3 to receive the crumbs. Supported on the base 2 are two upright standards 4—4 connected at their lower ends by a metal plate 5 which is integral with the standards. This plate fits in a horizontal slot 6 that projects backwardly from the forward or right-hand end, Fig. 1, of the base.

These standards are spaced apart by a distance suitable to receive a loaf of bread B between them. The upper ends of the standards 4—4 are secured together by a rod having nuts 7—7 threaded on opposite ends thereof and serving to hold the standards against the opposite ends of a tube 8 which spaces the upper ends of the standards, and, together with the rod, gives stiffness and rigidity to the structure.

The position of the end of the loaf of bread between the standards is gaged by a bar or stop 10 which preferably is of polygonal cross-section. As shown, this bar is square in cross-section, and it is mounted between two ears 12—12 which are integral with the plate 5 and standards 4—4. This bar is supported on a pivot rod 14 which projects through holes in the ears 12—12, the rod having a head 15 at one end and a thumb nut 16 threaded on its opposite end. By turning up the nut 16 the bar or stop 10 may be held in its operative position with sufficient friction to permit it to be adjusted about the rod 14 while still holding it against accidental displacement.

The knife used in slicing the loaf B is guided by the forward edge 17—17 of the standards 4—4 and consequently, the thickness of the slices made will depend upon the distance that the end of the loaf projects beyond these edges. This distance is determined by the gage or bar 10. Due to the fact that this bar is eccentrically mounted, the thickness of the slices cut will depend upon the angular position of the bar. The four sides of the bar are marked with thickness designations, namely, "Thick", "Medium", "Thin", and "Wafer", and by turning the bar so that the proper designation is uppermost, the gage is then set for the cutting of slices of that particular thickness. Referring to Fig. 4 it will be seen that when the bar 10 is in the position shown in full lines, the distance from its left-hand face to the edges 17—17 will be very short, and the slices made with this adjustment will be very thin, or of a thickness indicated by the word "Wafer". When this bar or gage is turned into the position $10^a$ its gaging face will be moved slightly away from the edges 17—17, and a somewhat thicker slice will be made. This is indicated by the word "Thin". When turned still further into the position $10^b$ a thick slice will be cut, and in the position $10^c$ a slice of medium thickness will be formed. The bar 10 could be made round or elliptical if desired.

It should be noted that the edges 17—17 are not at right angles to the base 2 but are inclined backwardly. In other words, these edges slope backwardly from points adjacent to the base up to points indicated at 18—18, Fig. 1, which are approximately level with the top of the loaf B. I have found that this arrangement is of decided advantage in causing the knife to follow the guiding edges 17—17. That is, the natural tendency is to hold the knife blade in approximately a vertical position during the slicing operation, and this tendency, therefore, causes the edge of the knife to follow the inclined guiding edges 17—17. Most people find it difficult to slice bread vertically, there being a tendency for the knife to slant slightly either forward or backward. If the guiding edges were arranged vertically a tendency to slant the knife forward would carry it away from the guides, but with these edges inclined backwardly, as shown, the knife edge naturally follows the guides notwithstanding a considerable tendency for the hand to slant the knife in one direction or the other.

The proper guiding of the knife is further facilitated by directing the forward edges of the guides upwardly toward a perpendicular position from the points 18—18, as indicated at 19—19. Preferably the latter edges of the guides terminate in notches or stops 20—20. In starting the slicing operation the knife is placed against the edges 19—19 and is moved backward and forward in the usual manner, and these edges guide the knife against the inclined edges 17—17 as the knife is moved downwardly at the beginning of the slicing operation. When the cut has been started in this manner, the knife thereafter tends to follow the edges 17—17.

When a slice has been severed it drops over the stop or gage 10, the knife is removed, the loaf B is moved forward until it strikes the stop again, and the cutting operation is then repeated. The standards protect the hands from contact with the knife during the slicing operation.

It will now be appreciated that the invention provides a very simple construction which can be manufactured very economically, and is convenient to use, the ease with which different thicknesses of slices can be cut being an important practical advantage.

In manufacturing the device the standards 4 and plate 5 are died out of a flat strip of sheet metal and the part so cut out is then bent up into the U-shape shown. This bending operation leaves the plate 5 slightly bowed or bent, as shown in Fig. 2, so that when this plate is inserted in the slot 6 it will bind somewhat in the slot and thus hold the standards firmly in position.

In packing the articles for shipment the U-shaped sheet metal member preferably is placed on the base 2, as shown in Fig. 3, with the bars 10 and 8 resting on one side of the base, and the plate 5 against the end of the base. This permits the packing of a relatively large number of these articles in a comparatively small space.

While I have herein shown and described the best embodiment of my invention that I have so far devised, it will be evident that this embodiment may be modified in many particulars without departing from the spirit or scope of the invention.

Having thus described my invention, what I desire to claim as new is:

1. A bread slicer comprising a base, a pair of standards supported by said base and spaced apart to receive a loaf of bread between them, said standards having knife guiding edges inclined with reference to the base.

2. A bread slicer comprising a base, a pair of standards supported by said base and spaced apart to receive a loaf of bread between them, the forward edges of said standards forming guides for a knife used in slicing said loaf, said edges being inclined backwardly, and means for gaging the position of the end of said loaf.

3. A bread slicer comprising a base, a pair of standards supported by said base and spaced apart to receive a loaf of bread between them, the forward edges of said standards forming guides for the knife used in slicing said loaf, and said edges being inclined backwardly from points near the base to points near the upper ends of the stands and then extending upwardly from the latter points at an angle to said edges.

4. A bread slicer comprising a base, a pair of standards supported by said base and spaced apart to receive a loaf of bread between them, the forward edges of said standards forming guides for a knife used in slicing said loaf, said edges being inclined backwardly, and the upper portions of said edges being sloped forward with reference to said inclined edges whereby they guide the knife against said inclined edges at the beginning of the slicing operation, and means for gaging the position of the end of said loaf relatively to said edges.

5. A bread slicer comprising a base, a pair of standards supported by said base and spaced apart to receive a loaf of bread between them, said standards having edges to guide the knife used in slicing said loaf, a stop comprising a bar positioned to engage the end of the loaf and gage its position relatively to said edges, and means eccentrically supporting the bar for adjustment to vary the spacing between the face thereof engaged by the loaf and the knife guiding edges of said standards.

6. A bread slicer comprising a U-shaped sheet metal member including two standards spaced apart to receive a loaf of bread between them, a base slotted to receive a part of said member and thereby to support said standards in upright positions, said standards having knife guiding edges, and a stop supported by said member in front of said standards to engage the end of said loaf and limit its movement forwardly between said standards.

7. A bread slicer comprising a board forming a base, a U-shaped sheet metal member including upright standards connected by a plate, said base having a horizontal slot therein extending backwardly from the forward end thereof, said plate being adapted to fit in said slot but being bent to bind in the slot, whereby it supports said standards in upright positions at opposite sides of said base, said standards having edges to guide a knife used in slicing said loaf, and a stop for engaging the end of said loaf and limiting the distance to which it can be moved forward between said standards.

8. A bread slicer comprising a board forming a base, a U-shaped sheet metal member including upright standards connected by a plate, said base having a horizontal slot therein extending backwardly from the forward end thereof, said plate being adapted to fit in said slot but being bent to bind in the slot, whereby it supports said standards in upright positions at opposite sides of said base, said standards having edges to guide a knife used in slicing said loaf, a bar located in front of said standards and forming a stop for the end of said loaf, ears rigid with said plate, and a pivot rod mounted in said ears and supporting said bar eccentrically for adjustment about said rod.

9. A bread slicer comprising two standards spaced apart to receive a loaf of bread between them, a member connecting the lower portions of said standards, and a base slotted to receive said member and support said standards in their operative positions, said standards having edges to guide a knife used in slicing said loaf.

JASPER WHITING.